(12) United States Patent
Bondy (10) Patent No.: US 11,883,913 B2
(45) Date of Patent: Jan. 30, 2024

(54) WELDING TORCH HANDLE WITH A COVER CAP AND A CAP HOLDER

(71) Applicant: ILLINOIS TOOL WORKS INC., Glenview, IL (US)

(72) Inventor: Craig Matthew Bondy, Windsor (CA)

(73) Assignee: ILLINOIS TOOL WORKS INC, Glenview, IL (US)

( * ) Notice: Subject to any disclaimer, the term of this patent is extended or adjusted under 35 U.S.C. 154(b) by 366 days.

(21) Appl. No.: 16/962,902

(22) PCT Filed: Feb. 27, 2018

(86) PCT No.: PCT/US2018/019895
§ 371 (c)(1),
(2) Date: Jul. 17, 2020

(87) PCT Pub. No.: WO2019/168499
PCT Pub. Date: Sep. 6, 2019

(65) Prior Publication Data
US 2021/0060688 A1 Mar. 4, 2021

(51) Int. Cl.
*B23K 9/133* (2006.01)
*B23K 9/32* (2006.01)
(Continued)

(52) U.S. Cl.
CPC .............. *B23K 9/164* (2013.01); *B23K 9/124* (2013.01); *B23K 9/133* (2013.01); *B23K 9/1336* (2013.01);
(Continued)

(58) Field of Classification Search
CPC ........ B23K 9/164; B23K 9/133; B23K 9/291; B23K 9/32; B23K 9/295; B23K 9/124; B23K 9/1336; B23K 9/173
(Continued)

(56) References Cited

U.S. PATENT DOCUMENTS

| 6,225,599 B1 * | 5/2001 | Altekruse ............... B23K 9/287 219/137.61 |
| 6,568,578 B1 * | 5/2003 | Kensrue ............... B23K 9/1336 226/176 |

(Continued)

FOREIGN PATENT DOCUMENTS

| CN | 201806537 U * | 4/2011 |
| CN | 104439626 | 3/2015 |

(Continued)

OTHER PUBLICATIONS

Machine English Translation of DE-8409904-U1 (Year: 1984).*
(Continued)

*Primary Examiner* — Sang Y Paik
*Assistant Examiner* — Erwin J Wunderlich
(74) *Attorney, Agent, or Firm* — McAndrews, Held & Malloy, Ltd.

(57) ABSTRACT

Some examples of the present disclosure relate to a cover cap for a welding torch. The cover cap is attached to a housing of the welding torch and rotatable between a closed position, where the cover cap covers an access port of the welding torch, and an open position, where the cover cap does not cover the access port. The welding torch may have welding components within the handle that may be accessed through the access port when the cover cap is in the open position. A cap holder may be used to hold the cover cap in the open position.

17 Claims, 7 Drawing Sheets

(51) Int. Cl.
*B23K 9/12* (2006.01)
*B23K 9/173* (2006.01)
*B23K 9/16* (2006.01)
*B23K 9/29* (2006.01)

(52) U.S. Cl.
CPC .............. *B23K 9/173* (2013.01); *B23K 9/291* (2013.01); *B23K 9/295* (2013.01); *B23K 9/32* (2013.01)

(58) Field of Classification Search
USPC ......... 219/137.2, 137.31, 121.48, 121.27, 74
See application file for complete search history.

(56) References Cited

U.S. PATENT DOCUMENTS

| | | | | |
|---|---|---|---|---|
| 6,998,575 | B1* | 2/2006 | Kensrue | B23K 9/285 219/137.31 |
| 7,038,168 | B2* | 5/2006 | Kensrue | B23K 9/173 219/137.2 |
| 7,465,902 | B2* | 12/2008 | Christopher | B23K 9/1336 219/137.7 |
| 8,269,143 | B2* | 9/2012 | Christopher | B23K 9/1336 219/137.7 |
| 8,448,804 | B2 | 5/2013 | Luburic | |
| 8,642,922 | B2* | 2/2014 | Flattinger | H02K 7/003 219/137.31 |
| 9,114,483 | B2* | 8/2015 | Enyedy | B23K 9/1336 |
| 9,186,746 | B2 | 11/2015 | Cossette et al. | |
| 9,636,768 | B2* | 5/2017 | Rozmarynowski | B23K 9/32 |
| 9,764,412 | B2 | 9/2017 | Mayr | |
| 10,081,072 | B2* | 9/2018 | Garvey | B23K 9/133 |
| 10,493,554 | B2* | 12/2019 | Daniels | B23K 9/323 |
| 11,548,089 | B2* | 1/2023 | Martin | B23K 9/1333 |
| 2005/0218129 | A1* | 10/2005 | Kensrue | B23K 9/133 219/137.31 |
| 2005/0224550 | A1* | 10/2005 | Matiash | B23K 9/1336 242/615.3 |
| 2005/0230373 | A1 | 10/2005 | Kensrue | |
| 2006/0219683 | A1* | 10/2006 | Kensrue | B23K 9/28 219/137.31 |
| 2009/0032514 | A1* | 2/2009 | Christopher | B23K 9/1336 219/137.9 |
| 2017/0021443 | A1* | 1/2017 | Garvey | B23K 9/1336 |
| 2017/0182582 | A1 | 6/2017 | Daniels et al. | |

FOREIGN PATENT DOCUMENTS

| | | | |
|---|---|---|---|
| CN | 205733379 | 11/2016 | |
| CN | 206253831 U | 6/2017 | |
| DE | 8409904 U1 * | 7/1984 | .......... H04M 1/0216 |
| DE | 202010001533 U1 * | 5/2010 | |
| JP | 2002013523 A | 1/2002 | |
| KR | 100828608 | 5/2008 | |
| KR | 20170131915 A * | 12/2017 | |
| KR | 20170131915 A | 12/2017 | |

OTHER PUBLICATIONS

European Patent Office, Examination Report, Application No. 18710279.3, dated Sep. 14, 2021, 4 pages.
International Search Report and Written Opinion for PCT Patent Application No. PCT/US2018/019895 dated Nov. 22, 2018. 10 Pages.
European Patent Office, Office Action, Application No. 18710279.3, dated May 6, 2022, 5 pages.

* cited by examiner

FIG. 5C

WELDING TORCH HANDLE WITH A COVER CAP AND A CAP HOLDER

TECHNICAL FIELD

The present disclosure generally relates to a welding torch and, more particularly, to cap holders for welding torch cover caps.

BACKGROUND

Welding torches sometimes enclose welding components (e.g. drive rollers, tension levers, etc.) that assist with their operation. The welding components may require maintenance and/or adjustment from time to time to prevent malfunction and/or correctly configure the torch for operation. Some welding torches have ports that provide access to the components in case maintenance and/or adjustment is desired. A cover cap may be used to cover the access port during operation. However, unattached cover caps can become lost, and attached cover caps may get in the way and/or become unattached.

BRIEF SUMMARY

Systems and methods are provided for cap holders for welding torch cover caps, substantially as shown in and/or described in connection with at least one of the figures, as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, similar or identical reference numerals are used to refer to similar or identical components.

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g.," and "for example" set off lists of one or more non-limiting examples, instances, or illustrations.

As used herein, a welding-type power supply and/or power source refers to any device capable of, when power is applied thereto, supplying welding, cladding, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Welding-type power, as used herein, refers to power suitable for welding, cladding, plasma cutting, induction heating, CAC-A and/or hot wire welding/preheating (including laser welding and laser cladding), carbon arc cutting or gouging, and/or resistive preheating.

The terms "coupled," "coupled to," and "coupled with" as used herein, each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

The terms "about" and/or "approximately," when used to modify or describe a value (or range of values), position, orientation, and/or action, mean reasonably close to that value, range of values, position, orientation, and/or action. Thus, the embodiments described herein are not limited to only the recited values, ranges of values, positions, orientations, and/or actions but rather should include reasonably workable deviations.

As used herein, the terms "front" and/or "forward" refer to locations closer to a welding arc, while "rear" refers to locations farther from a welding arc.

Some examples of the present disclosure relate to a welding torch handle, comprising a housing having an access port and a cap holder, and a cover cap configured to move between a closed position, where the cover cap covers the access port, and an open position, where the cover cap uncovers the access port, where the cap holder is configured to engage the cover cap when the cover cap is in the open position so as to hold the cover cap in the open position.

In some examples, the housing further includes a second cap holder configured to engage the cover cap when the cover cap is in a second open position so as to hold the cover cap in the second open position. In some examples, the housing further includes a latch configured to engage the cover cap when the cover cap is in the closed position so as to hold the cover cap in the closed position. In some examples, the housing contains welding components that may be accessed through the access port when the cover cap is in the open position. In some examples, the welding components comprise one or more of a drive roll, an idler roll, and a tension lever.

Some examples of the present disclosure relate to a welding torch handle, comprising a housing having an access port and a knuckle, wherein the knuckle comprises a grooved notch, and a cover cap comprising a cap knuckle having a protruding tongue configured to engage the grooved notch. The cover cap is configured to rotate about an axis between a closed position, where the cover cap covers the access port, and an open position, where the cover cap uncovers the access port. The protruding tongue is configured to engage the grooved notch when the cover cap is in the open position so as to hold the cover cap in the open position.

In some examples, the knuckle comprises a first knuckle, and the welding torch handle further comprises a second knuckle. In some examples, the grooved notch comprises a first grooved notch and the protruding tongue comprises a first protruding tongue, where the second knuckle further comprises a second grooved notch, the cover cap comprises a second protruding tongue, and the second protruding tongue is configured to engage the second grooved notch when the cover cap is in the open position. In some examples, the grooved notch comprises a first grooved notch, and the knuckle further comprises a second grooved notch configured to engage the protruding tongue. In some examples, the knuckle further comprises a bore and the cap knuckle further comprises a cap bore, where the bore and cap bore are aligned along the axis. An insert is positioned within the bore of the knuckle, and the insert comprises threads configured to engage complementary threads of a bolt. In some examples, the welding torch handle further comprises a bolt extending through the bore and the cap bore so as to create a joint between the housing and the cover cap, where the bolt comprises a first end having complementary threads that engage the threads of the insert and a second end having a head configured to engage a tool. In some examples, the housing contains welding components that may be accessed through the access port when the cover cap is in the open position. In some examples, the welding components comprise one or more of a drive roll, an idler roll, and a tension lever.

Some examples of the present disclosure relate to a welding torch, comprising a handle. The handle comprises a housing having an access port and a knuckle comprising a grooved notch. The handle further comprises a cover cap comprising a cap knuckle having a protruding tongue configured to engage the grooved notch. The cover cap is configured to rotate about an axis between a closed position, where the cover cap covers the access port, and an open position, where cover cap uncovers the access port. The protruding tongue is configured to engage the grooved notch when the cover cap is in the open position so as to hold the cover cap in the open position.

In some examples, the knuckle comprises a first knuckle, and the handle further comprises a second knuckle. In some examples, the grooved notch comprises a first grooved notch, the protruding tongue comprises a first protruding tongue, the second knuckle further comprises a second grooved notch, the cover cap comprises a second protruding tongue, and the second protruding tongue is configured to engage the second grooved notch when the cover cap is in the open position. In some examples, the grooved notch comprises a first grooved notch, and the knuckle further comprises a second grooved notch configured to engage the protruding tongue. In some examples, the knuckle further comprises a bore and the cap knuckle further comprises a cap bore, the bore and cap bore are aligned along the axis, an insert is positioned within the bore of the knuckle, and the insert comprises threads configured to engage complementary threads of a bolt. In some examples, the welding torch further comprises a bolt extending through the bore and the cap bore so as to create a joint between the housing and the cover cap, where the bolt comprises a first end having complementary threads that engage the threads of the insert and a second end having a head configured to engage a tool, and where the insert further comprises a textured outer surface configured to increase friction between the insert and an inner surface of the knuckle surrounding the bore. In some examples, the welding torch further comprises a cover plate that covers a portion of the access port when the cover cap is in the open and closed positions.

Some examples of the present disclosure relate to a cover cap for a welding torch. The cover cap is attached to a housing of the welding torch and rotatable between a closed position, where the cover cap covers an access port of the welding torch, and an open position, where the cover cap does not cover the access port. The welding torch may have welding components within the handle that may be accessed through the access port when the cover cap is in the open position. A cap holder may be used to hold the cover cap in the open position.

Figure 1:
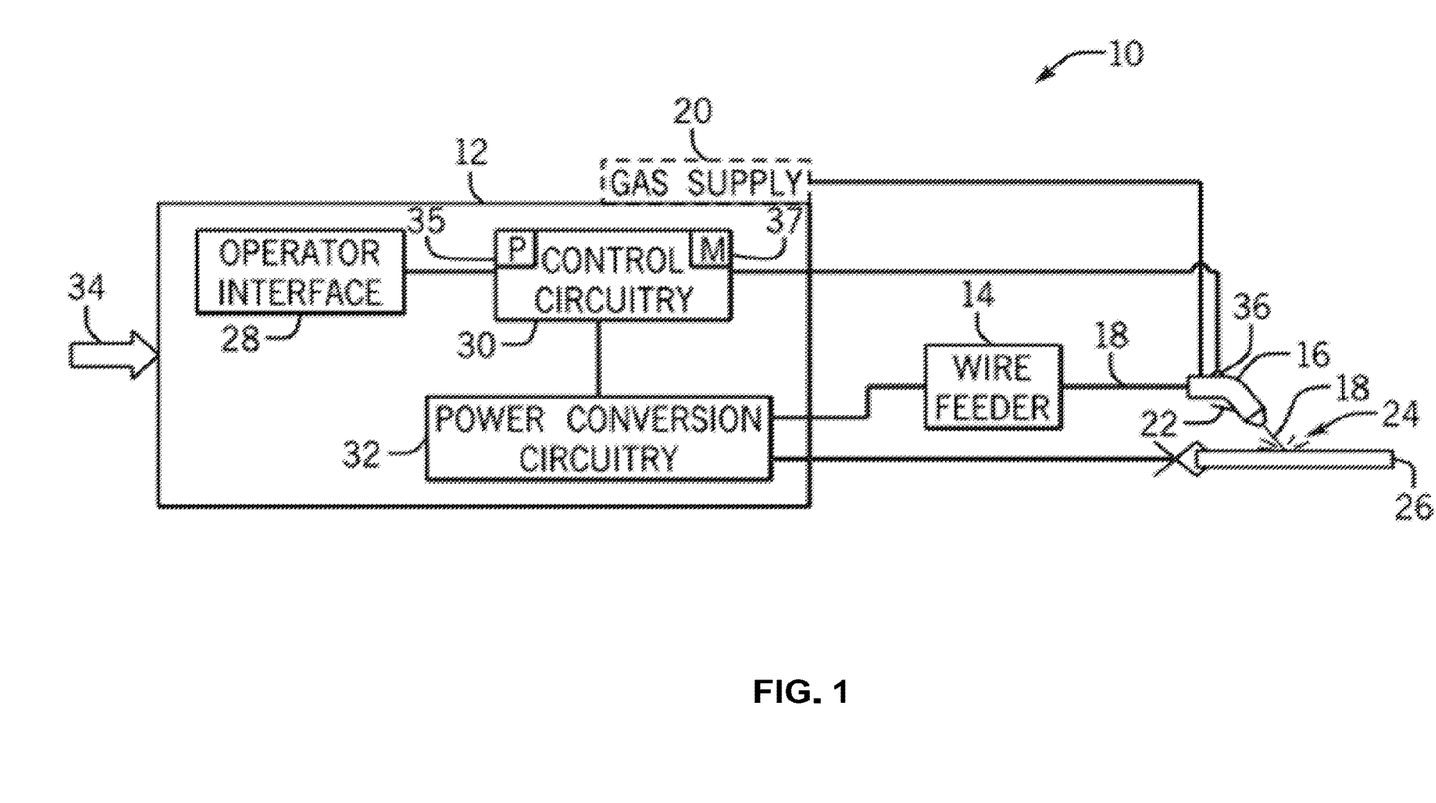
FIG. 1 is an example of a welding system, in accordance with aspects of this disclosure.

FIG. 1 shows an example of a welding-type system 10 that may use the example welding torch, clasp, strain relief, and/or protective sleeve discussed above and/or below. While the specific welding-type system 10 of FIG. 1 is a gas metal arc welding (GMAW) system, other types of welding-type systems may be used. FIG. 1 illustrates the welding-type system 10 as including a welding-type power source 12 coupled to a wire feeder 14. In the illustrated example, the power source 12 is separate from the wire feeder 14, such that the wire feeder 14 may be positioned at some distance from the power source 12 near a welding location. However, it should be understood that the wire feeder 14, in some examples, may be integral with the power source 12. In some examples, the wire feeder 14 may be removed from the system 10 entirely. In the example of FIG. 1, the power source 12 supplies welding-type power to a torch 16 through the wire feeder 14. In some examples, the power source 12 may supply welding-type power directly to the torch 16 rather than through the wire feeder 14. In the example of FIG. 1, the wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In some examples, the welding system 10 may receive weld settings from the operator via an operator interface 28 provided on the power source 12 (and/or power source housing). The weld settings may be communicated to control circuitry 30 within the power source 12. In some examples, the control circuitry 30 operates to control generation of welding-type power for carrying out the desired welding-type operation. In the example of FIG. 1, the control circuitry 30 is coupled to the power conversion circuitry 32, which may supply the welding-type power (e.g., pulsed waveform) that is applied to the torch 16. In the example of FIG. 1, the power conversion circuitry 32 is coupled to a source of electrical power as indicated by arrow 34. The source may be a power grid, an engine-driven generator, batteries, fuel cells or other alternative sources. In some examples, the control circuitry 30 may control the current and/or the voltage of the welding-type power supplied to the torch 16. The control circuitry 30 may monitor the current and/or voltage of the arc 24 based at least in part on one or more sensors 36 within the wire feeder 14 and/or torch 16. In some examples, a processor 35 of the control circuitry 30 may determine and/or control the arc length or electrode extension based at least in part on feedback from the sensors 36. The processor 35 may determine and/or control the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30.

Figure 2:
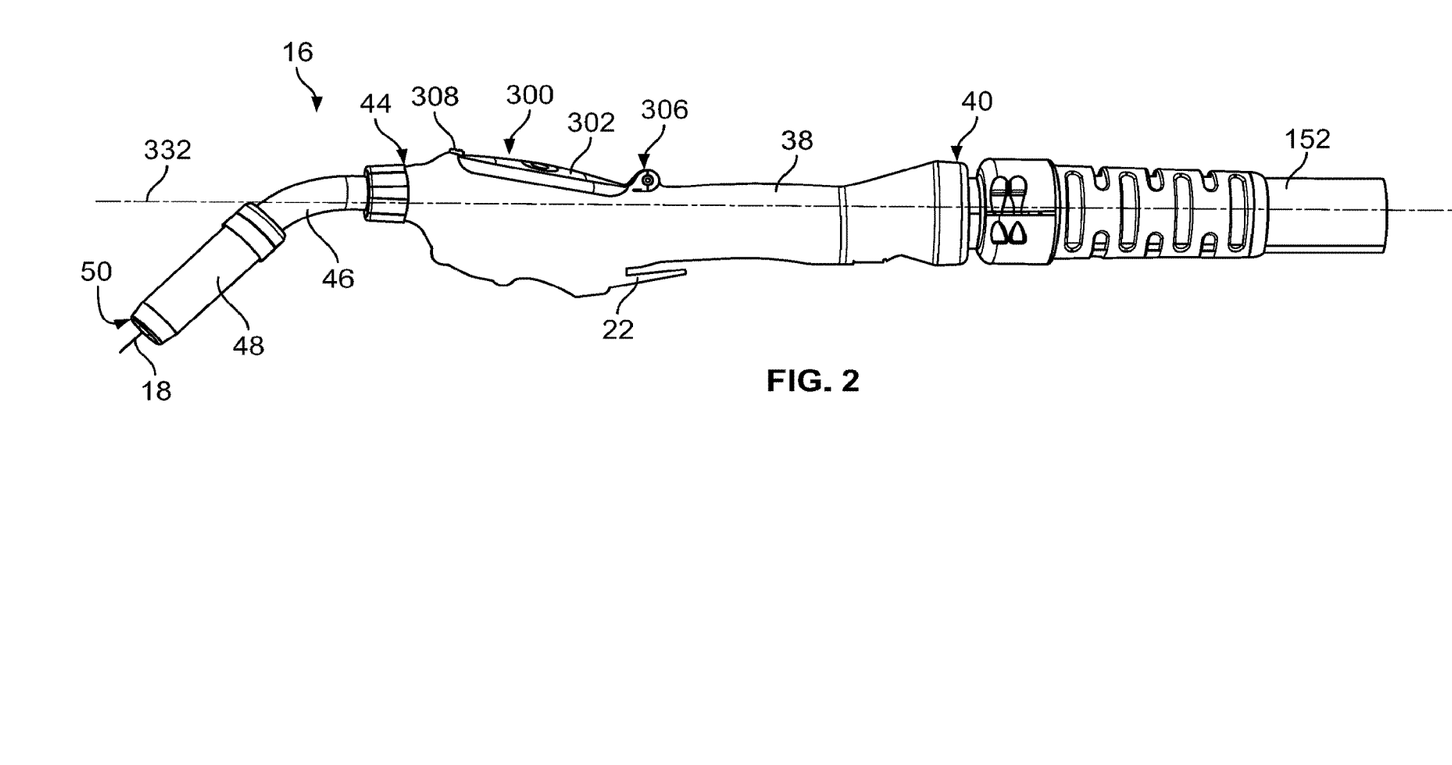
FIG. 2 is a side view of an example welding torch, in accordance with aspects of this disclosure.

FIG. 2 is an example welding torch 16 that may be used in and/or with the example welding system of FIG. 1. As discussed in relation to FIG. 1, the torch 16 includes the trigger 22 for initiating a weld (and/or other welding-type operation) and/or supplying the electrode 18 to the weld. Specifically, the trigger 22 is disposed on a handle 38. A welding operator may hold the handle 38 when performing a weld. The torch 16 also includes a gooseneck 46 extending out of a front end 44 of the handle 38. As such, the gooseneck 46 is coupled between the handle 38 and a welding nozzle 48.

At a rear end 40, the handle 38 is coupled to a cable assembly 152. In some examples, the cable assembly 152 may comprise a plurality of cable assemblies. Each cable assembly 152 may include one or more cables (e.g., conductors, conductor bundles, etc.), wires, lines, hoses, liners, filler, insulation, gaps, and/or any other content. In some examples, the cables are welding cables that provide electrical power, welding consumables (e.g., the electrode, the shielding gas, coolant, and so forth), and/or other welding supplies to the torch 16. Welding consumables, such as filler wire and/or gas, generally travel through cable assembly 152 into the handle 38 through the rear end 40 of the handle and exit at the front end 44 end of the handle. When the trigger 22 is pressed or actuated, welding wire (e.g., electrode 18) travels through a cable assembly 152, the handle 38, the gooseneck 46, and the welding nozzle 48, so that the welding wire extends out of an end 50 (i.e., torch tip) of the welding nozzle 48. While the example torch 16 illustrated in FIG. 2 is designed for welding by a human operator, one or more torches designed for use by a robotic welding system may alternatively, or additionally, be used with the welding system of FIG. 1. For example, the torch 16 may be modified to omit the trigger 22, may be adapted for water cooling, etc.

In the example of FIG. 2, the torch 16 further includes a cover cap 300. The cover cap 300 includes a main body 302 that covers an access port 304 of the handle 38, as further discussed below. A rear end of the cover cap 300 is hingedly (and/or movably, pivotally, rotatably, etc.) attached to the handle via a joint 306. The joint 306 allows the cover cap 300 to move between open and closed positions, as further explained below. In the example of FIG. 2, the cover cap 300 is in the closed position. The cover cap 300 further includes a latch 308 proximate a front end of the cover cap 300. The latch 308 secures the cover cap 300 to the handle 38 when the cover cap 300 is in the closed position. More particularly, the latch 308 engages (and/or interacts, interlocks, connects, etc.) with a complementary catch in and/or on the handle 38. While the latch 308 is engaged with the catch, the cover cap 300 is prevented from moving about the joint 306. The latch 308 is configured such that an operator may press a tab of the latch 308 to disengage the latch 308 from the catch in the handle 38. Once the latch 308 is disengaged, the cover cap 300 is free to move about the joint 306. In some examples, the cover cap 300 may be secured to the handle 38 when in the closed position using some alternative and/or additional fastener and/or fastening method, other than the latch 308.

Figure 3:
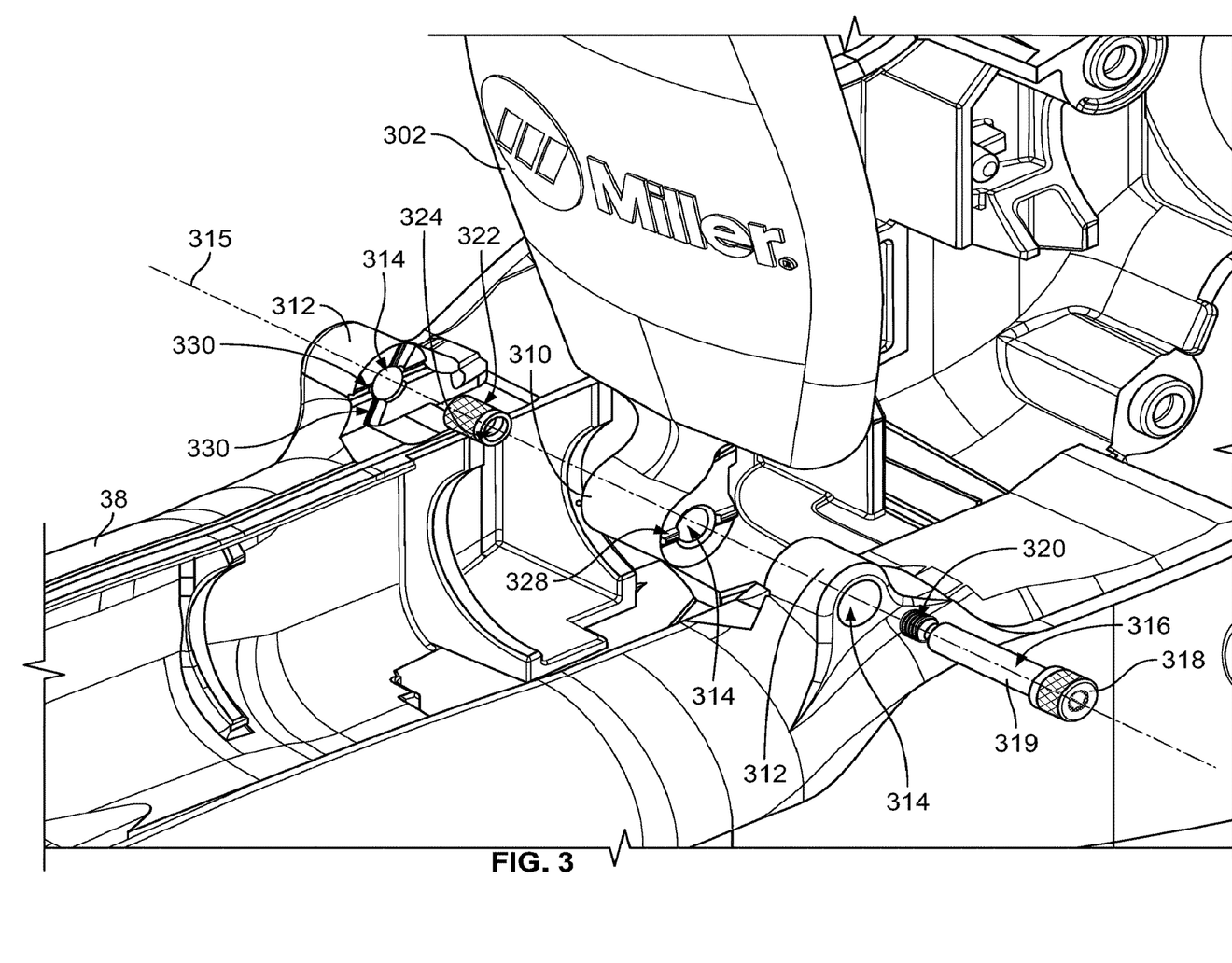
FIG. 3 is a partial exploded view of a handle of the example welding torch of FIG. 2, focusing on a cover cap, in accordance with aspects of this disclosure.

FIG. 3 shows an exploded view of the handle 38 and cover cap 300, centering on the joint 306 of the cover cap 300. As shown in the example of FIG. 3, the joint 306 is comprised of a hinged connection between the cover cap 300 and the handle 38. More particularly, the joint 306 is comprised of a connection between a cap knuckle 310 of the cover cap 300, and two shoulder knuckles 312 of the handle 38. In some examples, the joint 306 may be comprised of only one shoulder knuckle 312, or three or more shoulder knuckles 312. In the example of FIG. 3, the cap knuckle 310 is positioned between the shoulder knuckles 312, such that a shoulder knuckle 312 is positioned on either side of the cap knuckle 310.

The cap knuckle 310 is approximately cylindrical. The shoulder knuckles 312 are approximately half cylindrical, with the other half blended into the general profile of the handle 38. The shoulder knuckles 312 and the cap knuckle 310 include approximately cylindrical bores 314. The bores 314 are aligned along, and/or centered around, a bore axis 315. When aligned, the shoulder knuckles 312, cap knuckle 310, and/or bores 314 form a barrel that is sized, shaped, and/or otherwise configured to receive a bolt 316.

The bolt 316 is sized, shaped, and/or otherwise configured to extend through the barrel (i.e. aligned bores 314). In the example of FIG. 3, the bolt 316 is a shoulder bolt having a head 318 on a first end and screw threads 320 on a second end. The bolt 316 includes a cylindrical shoulder 319 extending between the head 318 and the screw threads 320. The shoulder 319 comprises a smooth surface configured to minimize friction in the joint 306, so as to allow the cover cap 300 to move about the joint 306. The head 318 is configured to fit a tool, such as an Allen wrench. In some examples, the head 318 may alternatively, or additionally, be configured for a different tool, such as a Phillips and/or flat head screwdriver, a traditional wrench, or some other appropriate tool.

The joint 306 further includes an insert 322 that is sized, shaped, and/or otherwise configured to fit within the bore 314 of a shoulder knuckle 312. The insert 322 is approximately cylindrical and includes a channel. The channel is surrounded by an internal surface of the insert 322 that is formed with threaded grooves 324. The threaded grooves 324 of the insert are configured to engage with the screw threads 320 of the bolt 316. Thus, when the bolt 316 extends through the barrel (formed by the aligned knuckles 310, 312 and/or bores 314) and engages the insert 322, the configuration forms a joint 306 between the cover cap 300 and the handle 38 which allows the cover cap 300 to rotate (and/or pivot, revolve, move, etc.) about the bore axis 315 while staying connected to the handle.

Figure 4:
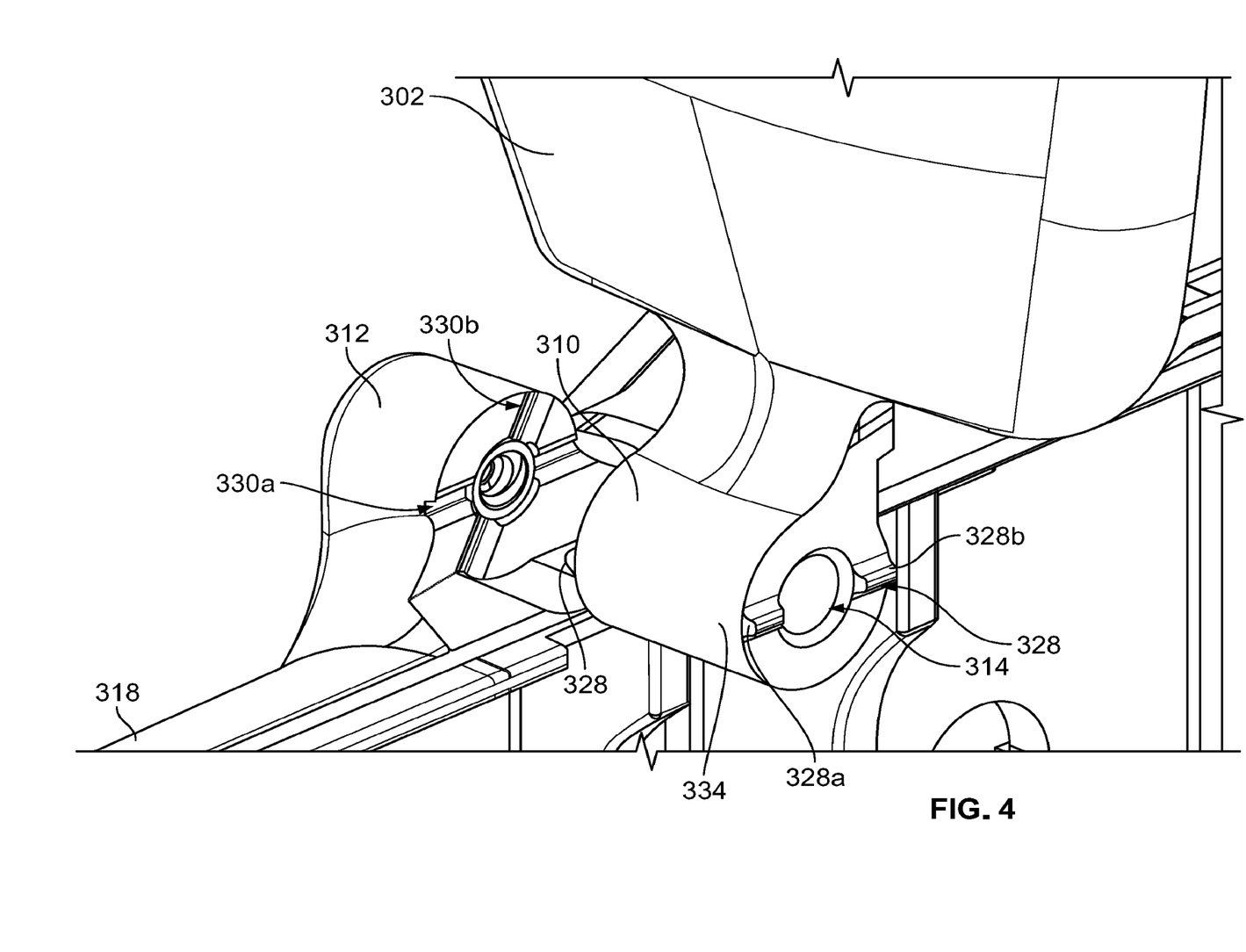
FIG. 4 is an enlarged view of FIG. 3, with an insert positioned in a bore of a shoulder knuckle, in accordance with aspects of this disclosure.

The torch 16 further includes a cap holder that holds the cover cap 300 in an open position, so that an operator can access welding components 326 within the access port 304 without the cover cap 300 getting in the way. The cap holder is comprised of complementary tongue and groove features of the shoulder knuckles 312 and cap knuckle 310. In the examples of FIGS. 3 and 4, the cap knuckle 310 includes a protruding tongue 328. The shoulder knuckle 312 includes complementary knuckle grooves 330. Though only one protruding tongue 328 is shown on one side of the cap knuckle 310 and shoulder knuckle 312 in FIGS. 3 and 4, persons of ordinary skill will understand that the protruding tongue 328 may be formed on both sides of the cap knuckle 310 to engage complementary knuckle grooves 330 on both shoulder knuckles 312.

In the example of FIGS. 3 and 4, the cap knuckle 310 includes two protruding tongues 328, one on each side of the cap knuckle 310. In some examples, the cap knuckle 310 may include four or more protruding tongues 328, with two or more protruding tongues 328 on each side of the cap knuckle 310. The protruding tongues 328 extend approximately perpendicular to the bore axis 315. The protruding tongues 328 are approximately bisected by the bore 314 of the cap knuckle 310, splitting them into half sections 328a, 328b (as shown, for example, in FIG. 4). The protruding tongues 328 are approximately shaped as trapezoidal prisms in the example of FIGS. 3 and 4, though they may be shaped differently in other examples. The protruding tongues 328 are sized, shaped, and/or otherwise configured to fit within and/or engage the knuckle grooves 330.

The knuckle grooves 330 are formed on the shoulder knuckles 312. More particularly, the knuckle grooves 330 are formed on a side (and/or face) of the shoulder knuckles 312 facing the cap knuckle 310. The knuckle grooves 330 extend approximately perpendicular to the bore axis 315, like the protruding tongues 328. The knuckle grooves 330 are also approximately bisected by the bores 314 of the shoulder knuckles 312, splitting them into half sections that are configured to receive and/or engage the half sections of the protruding tongues 328. In the example of FIG. 4, there are two knuckle grooves 330 at two different rotational angles with respect to a torch axis 332 that extends through an approximate longitudinal center of the torch 16. For example, the knuckle groove 330a is formed approximately parallel to the torch axis 332, such that a plane extending through both the knuckle groove 330a and the bore axis 315 will never intersect the torch axis 332. The knuckle groove 330a also has approximately the same orientation as the protruding tongue 328 shown in FIGS. 3 and 4, such that the knuckle groove 330a will engage the protruding tongue 328 when the cover cap 300 is in such an orientation. The body 302 of the cover cap 300 is further oriented in an open position approximately vertically, and/or approximately perpendicular to the torch axis 332 and/or bore axis 315. Thus, the cover cap 300 will be held in an open position when the protruding tongue engages the knuckle groove 330a. The resultant opening is sufficiently large to allow exposure and/or access to welding components 326 within an access port 304 of the handle 38.

In the example of FIG. 4, the second knuckle groove 330b is angled with respect to the first knuckle groove 330a. The second knuckle groove 330b is also angled with respect to the torch axis 332, such that a plane extending through both the knuckle groove 330b and the bore axis 315 will intersect the torch axis 332. The knuckle groove 330b is configured to engage the protruding tongue 328 when the cover cap 300 is rotated even farther open, past the knuckle groove 330a, to a wider open position (e.g. an open position where the body 302 forms an approximately obtuse angle with the torch axis 332). Thus, an operator has options when opening the cover cap 300 and/or access port 304. The operator can open the cover cap 300 to a first open position, where the protruding tongue 328 of the cap knuckle 310 engages the first knuckle groove 330a, or to a second open position, where the protruding tongue 328 engages the second knuckle groove 330.

In the example of FIGS. 3 and 4, the protruding tongues 328 on both sides of the cap knuckle 310 are approximately aligned (i.e. parallel). Pairs of knuckle grooves 330 on both shoulder knuckles 312 may also be aligned (i.e. parallel), such that the aligned knuckle grooves 330 on the shoulder knuckles 312 engage the aligned protruding tongues 328 on the cap knuckle 310 simultaneously. This simultaneous engagement may help to retain the cover cap 300 in the desired open position.

In some examples, a protruding tongue 328 on one side of the cap knuckle 310 may be angularly offset from a protruding tongue 328 on the opposite side of the cap knuckle 310. In such an example, the knuckle grooves 330 on the shoulder knuckles 312 may still be aligned, such that only one protruding tongue 328 on one side of the cap knuckle 310 engages one knuckle groove 330 on one shoulder knuckle 312 at any given open position, while the other protruding tongue 328 on the other side of the cap knuckle 310 remains disengaged. In some examples, the knuckle grooves 330 on opposite knuckle shoulders 312 may be angularly offset from one another, while the protruding tongues 328 on both sides of the cap knuckle remain aligned, resulting in a similar situation where only one protruding tongue 328 on one side of the cap knuckle 310 engages one knuckle groove 330 on one shoulder knuckle 312 at any given open position, while the other protruding tongue 328 on the other side of the cap knuckle 310 remains disengaged. In some examples, both the protruding tongues 328 on either side of the cap knuckle 310 and the knuckle grooves 330 on opposite shoulder knuckles 312 may be angularly offset.

In some examples, one or more protruding tongues 328 may be additionally, or alternatively, formed on a knuckle body 334 of the cap knuckle 310, parallel to the bore axis 315. In such an example, the protruding tongues 328 of the knuckle body 334 may be configured to engage with one or more grooves on the handle 38 when the cover cap 300 is in an open position. In some examples, the protruding tongues 328 on the knuckle body 334 may connect two or more protruding tongues 328 (and/or half sections 328a, 328b of the protruding tongues 328) on the sides of the cap knuckle 310.

Figure 5A:
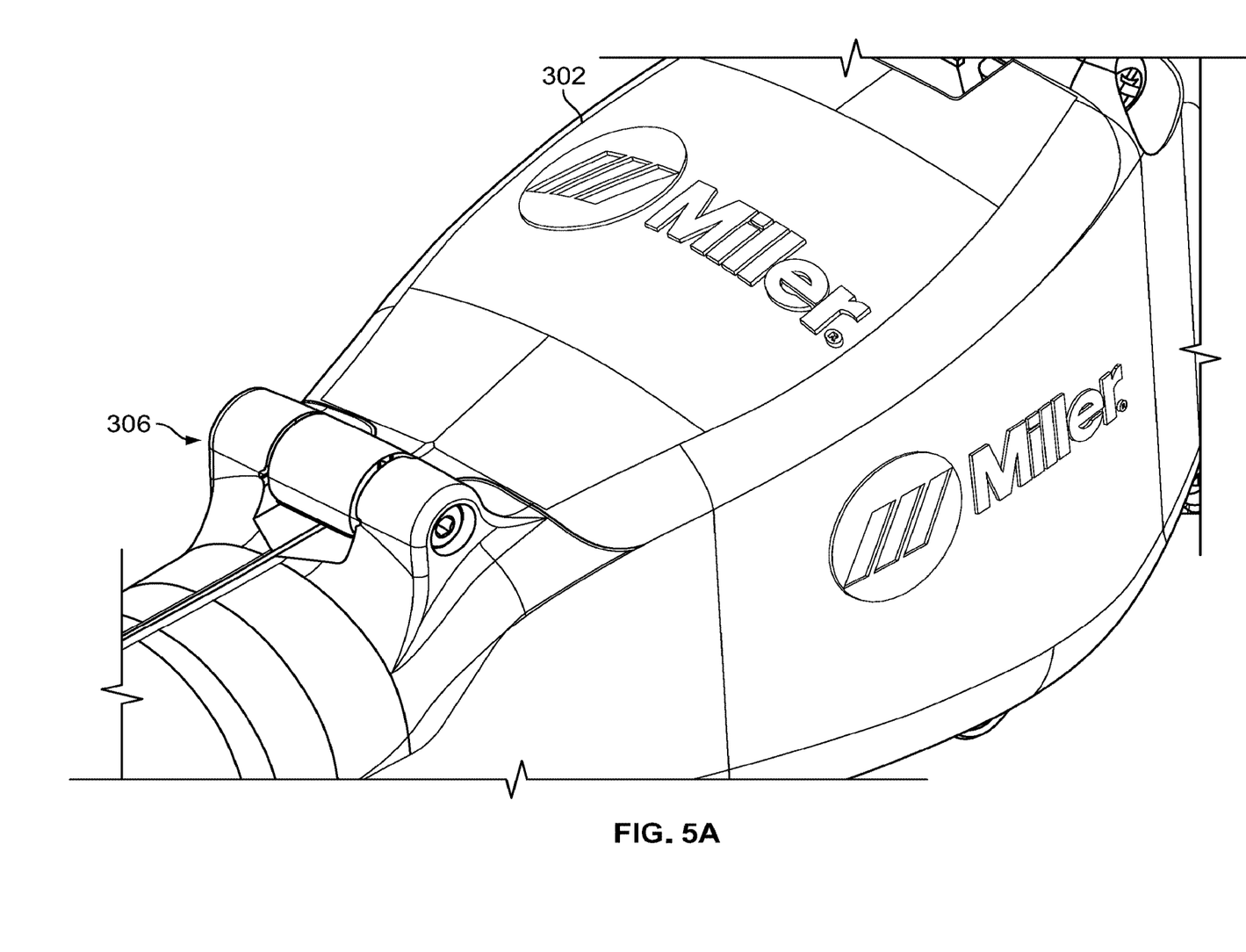
FIG. 5a is a perspective view of the handle of the example welding torch of FIG. 2, with the cover cap in a closed position, in accordance with aspects of this disclosure.

In operation, an operator may use the welding torch 16 to perform a welding-type operation. During the welding-type operation the cover cap 300 may be in a closed position, such as shown in FIG. 5a (and/or FIG. 2), for example. While in the closed position, the latch 308 of the cover cap 300 engages the catch in and/or on the handle 38 to retain the cover cap 300 in the closed position. While in the closed position, the cover cap 300 substantially covers and/or closes the access port 304 and is prevented from rotating about the joint 306 to an open position.

When the operator desires to access the welding components 326 in the handle 38, the operator may open the cover cap 300 to gain access to the welding components 326. To open the cover cap 300, the operator may first press the tab of the latch 308, to disengage the latch 308 from the catch. Once the latch 308 is disengaged, the cover cap 300 may be rotated about the joint 306 to an open position. The operator may move the cover cap 300 to an open position where one or more protruding tongues 328 engage one or more knuckle grooves 330. Once the protruding tongue(s) 328 engage(s) the knuckle groove(s) 330, the cover cap 300 will be retained in an open position. While the cover cap 300 is in the open position, the access port 304 is uncovered and the welding components 326 within the handle 38 proximate the access port 304 are uncovered and/or exposed. Thus, an operator may access the welding components 326 while the cover cap 300 is in the open position, such as for maintenance, cleaning, adjustment, etc.

Figure 5B:
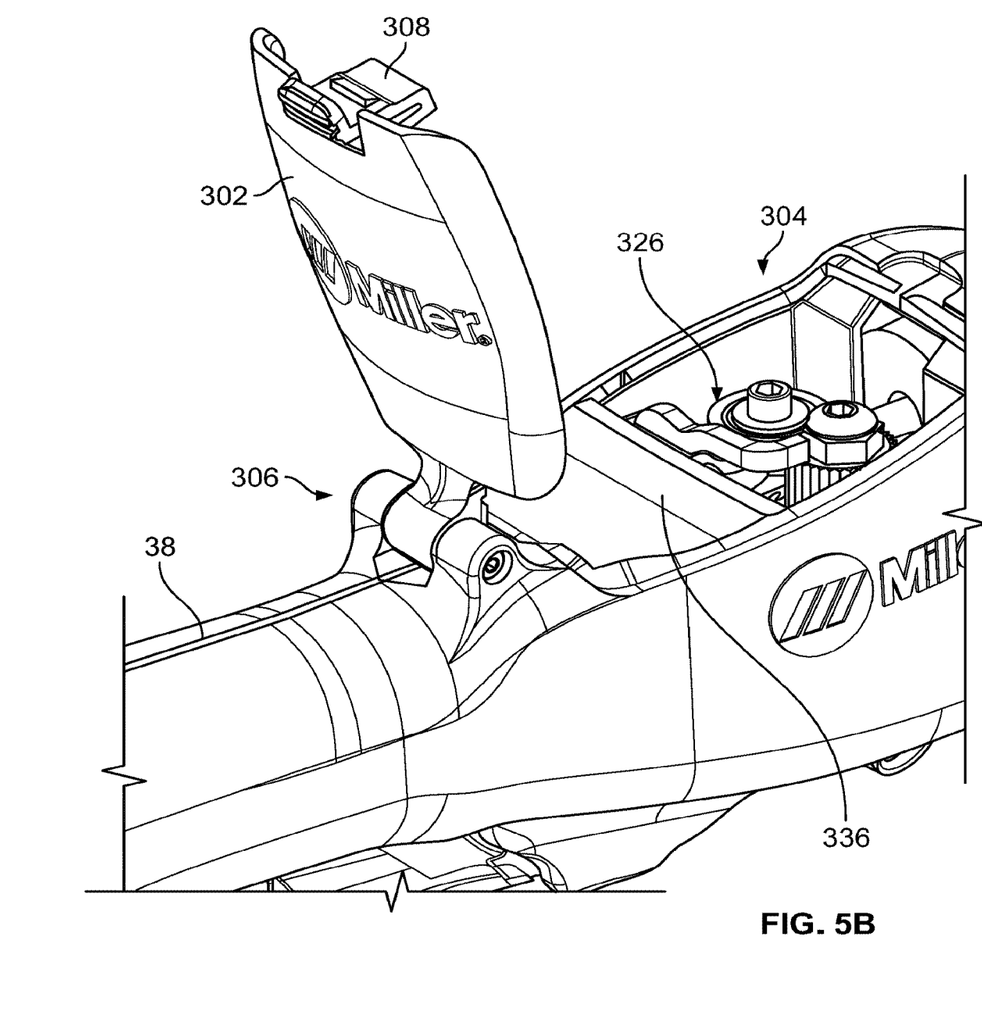
FIG. 5b is a perspective view of the handle of the example welding torch of FIG. 2, with the cover cap in a first open position, in accordance with aspects of this disclosure.
Figure 5C:
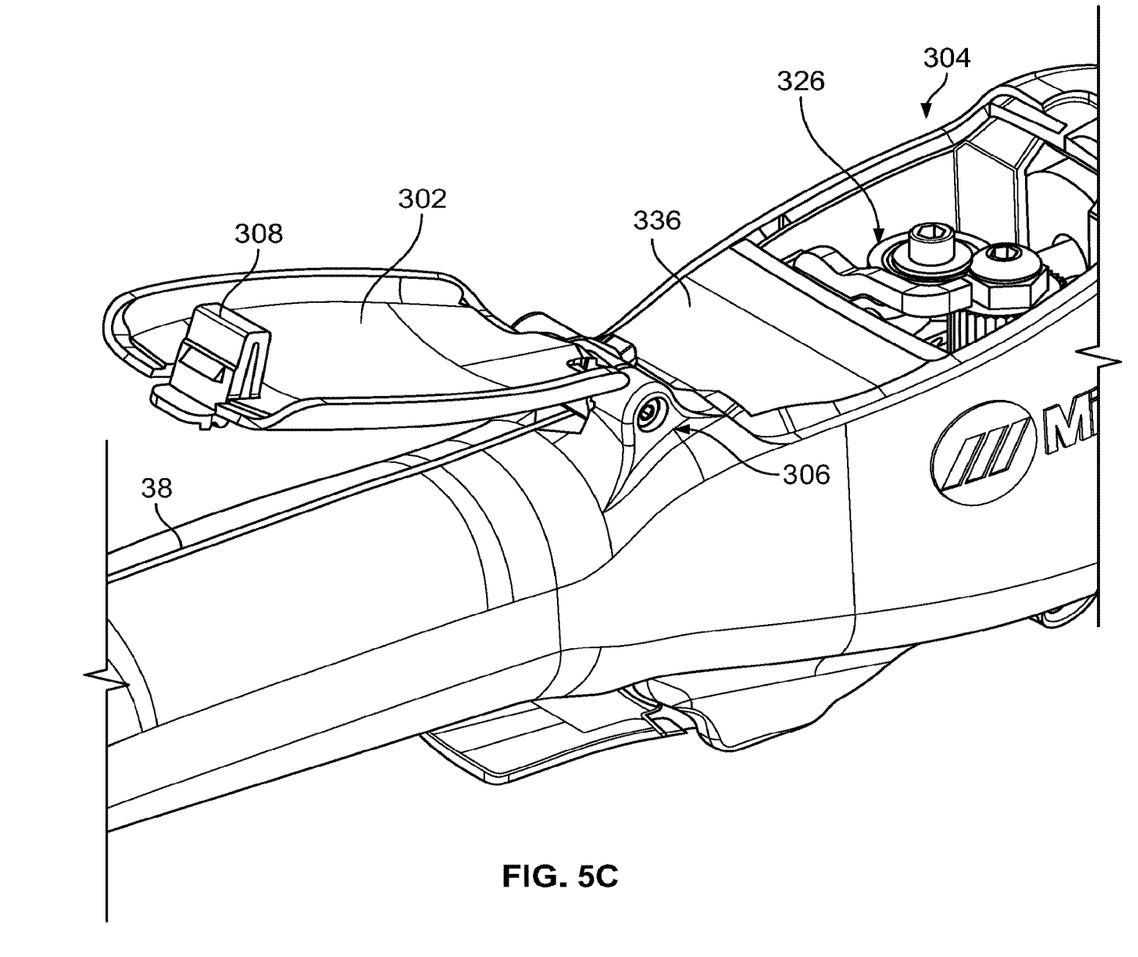
FIG. 5c is a perspective view of the handle of the example welding torch of FIG. 2, with the cover cap in a second open position, in accordance with aspects of this disclosure.

FIG. 5b shows the cover cap 300 in a first open position (e.g. with protruding tongues 328 engaged with knuckle grooves 330a). In the first open position, the cover cap 300 is tilted back at about a 90 degree angle (or slightly more than 90 degree angle) with respect to the torch axis 332. The access port 304 is uncovered, revealing and/or exposing the welding components 326 within the handle. The retention of the cover cap 300 in the open position allows an operator to access the welding components 326 without the cover cap 300 moving around, getting in the way, and/or coming unattached. FIG. 5c shows the cover cap 300 in a second open position (e.g. with protruding tongues 328 engaged with knuckle grooves 330b). The cover cap 300 is tilted back at an angle greater than 90 degrees. The access port 304 is uncovered, revealing and/or exposing the welding components 326 within the handle. The position of the cover cap 300 illustrated in FIG. 5c provides an even larger opening for an operator to access the welding components 326 (relative to the position illustrated in FIG. 5b) without the cover cap 300 moving around, getting in the way, and/or coming unattached. Though most of the access port 304 is uncovered when the cover cap 300 is in either open position, a cover plate 336 continues to cover some of the more sensitive welding components (e.g. a motor) within the handle 38 in both open positions.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding torch handle, comprising:
   a housing having an access port and a knuckle, wherein the knuckle comprises a bore and a grooved notch extending radially from the bore;
   a cover cap comprising a cap knuckle having a cap bore and a protruding tongue configured to engage the grooved notch; and
   a bolt extending through the bore and the cap bore so as to create a joint between the housing and the cover cap,
   wherein the cover cap is configured to rotate about the joint between a closed position, where the cover cap covers the access port, and an open position, where the cover cap uncovers the access port, and wherein the protruding tongue is configured to engage the grooved notch when the cover cap is in the open position so as to retain the cover cap in the open position.

2. The welding torch handle of claim 1, wherein the knuckle comprises a first knuckle and the bore comprises a first bore, wherein the welding torch handle further comprises a second knuckle comprising a second bore.

3. The welding torch handle of claim 2, wherein the grooved notch comprises a first grooved notch and the protruding tongue comprises a first protruding tongue, wherein the second knuckle further comprises a second grooved notch, the cover cap comprises a second protruding tongue, and the second protruding tongue is configured to engage the second grooved notch when the cover cap is in the open position.

4. The welding torch of claim 1, wherein the grooved notch comprises a first grooved notch, wherein the knuckle further comprises a second grooved notch configured to engage the protruding tongue.

5. The welding torch handle of claim 1, further comprising an insert positioned within the bore of the knuckle, wherein the insert comprises threads configured to engage complementary threads of the bolt.

6. The welding torch handle of claim 5, wherein the bolt comprises a first end having complementary threads that engage the threads of the insert and a second end having a head configured to engage a tool.

7. The welding torch handle of claim 1, wherein the housing contains welding components that may be accessed through the access port when the cover cap is in the open position.

8. The welding torch handle of claim 7, wherein the welding components comprise one or more of a drive roll, an idler roll, and a tension lever.

9. The welding torch handle of claim 1, wherein the cover cap is further configured to rotate about the joint between the open position, a second open position, and the closed position, and where the cover cap is configured to be secured at the open position to create a first opening and at the second open position to create a larger opening than the first opening.

10. A welding torch, comprising:
    a handle, wherein the handle comprises:
      a housing having an access port and a knuckle, wherein the knuckle comprises a bore and a grooved notch extending radially from the bore,
      a cover cap comprising a cap knuckle having a cap bore and a protruding tongue configured to engage the grooved notch, and
      a bolt extending through the bore and the cap bore so as to create a joint between the housing and the cover cap,
      wherein the cover cap is configured to rotate about the joint between a closed position, where the cover cap covers the access port, and an open position, where cover cap uncovers the access port, and wherein the protruding tongue is configured to engage the grooved notch when the cover cap is in the open position. so as to retain the cover cap in the open position.

11. The welding torch of claim 10, wherein the knuckle comprises a first knuckle and the bore comprises a first bore, wherein the welding torch further comprises a second knuckle comprising a second bore.

12. The welding torch of claim 11, wherein the grooved notch comprises a first grooved notch and the protruding tongue comprises a first protruding tongue, wherein the second knuckle further comprises a second grooved notch, the cover cap comprises a second protruding tongue, and the second protruding tongue is configured to engage the second grooved notch when the cover cap is in the open position.

13. The welding torch of claim 10, wherein the grooved notch comprises a first grooved notch, and wherein the knuckle further comprises a second grooved notch configured to engage the protruding tongue.

14. The welding torch of claim 10, further comprising an insert positioned within the bore of the knuckle, wherein the insert comprises threads configured to engage complementary threads of the bolt.

15. The welding torch of claim 14, wherein the insert further comprises a textured outer surface configured to increase friction between the insert and an inner surface of the knuckle surrounding the bore.

16. The welding torch of claim 12, further comprising a cover plate that covers a portion of the access port when the cover cap is in the open and closed positions.

17. The welding torch handle of claim 10, wherein the cover cap is further configured to rotate about the joint between the open position, a second open position, and the closed position, and where the cover cap is configured to be secured at the open position to create a first opening and at the second open position to create a larger opening than the first opening.

* * * * *